(12) United States Patent  
Nakamura

(10) Patent No.: US 10,764,448 B1  
(45) Date of Patent: Sep. 1, 2020

(54) INFORMATION PROCESSING APPARATUS AND IMAGE FORMING APPARATUS PERFORMING FILE CONVERSION OF HANDWRITING COMMENT AND COMMENT EXTRACTION METHOD

(71) Applicant: KYOCERA Document Solutions Inc., Osaka (JP)

(72) Inventor: Masayoshi Nakamura, Concord, CA (US)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/393,507

(22) Filed: Apr. 24, 2019

(51) Int. Cl.  
*H04N 1/00* (2006.01)  
*G06K 9/68* (2006.01)  
*G06K 9/34* (2006.01)

(52) U.S. Cl.  
CPC ......... *H04N 1/00331* (2013.01); *G06K 9/344* (2013.01); *G06K 9/6835* (2013.01); *G06K 2209/01* (2013.01); *H04N 2201/0094* (2013.01); *H04N 2201/3245* (2013.01)

(58) Field of Classification Search  
CPC ....... H04N 2201/3245; H04N 1/00331; H04N 2201/3243  
See application file for complete search history.

(56) References Cited

U.S. PATENT DOCUMENTS

| | | | | |
|---|---|---|---|---|
| 6,043,823 | A * | 3/2000 | Kodaira | G06K 9/00469 345/619 |
| 2007/0052685 | A1 * | 3/2007 | Wakai | G06F 9/451 345/173 |
| 2008/0144131 | A1 * | 6/2008 | Jung | G06K 9/2063 358/474 |
| 2009/0109458 | A1 * | 4/2009 | Nagata | H04N 1/32144 358/1.9 |
| 2009/0296161 | A1 * | 12/2009 | Iura | G06F 21/608 358/3.28 |
| 2011/0141521 | A1 * | 6/2011 | Qiao | H04N 1/32112 358/1.16 |
| 2011/0249299 | A1 * | 10/2011 | Wu | G06K 9/2063 358/3.26 |
| 2017/0155790 | A1 * | 6/2017 | Tanaka | H04N 1/2166 |
| 2017/0220538 | A1 * | 8/2017 | Hatfield | G06F 3/04883 |
| 2018/0032485 | A1 | 2/2018 | Kashimoto | |

FOREIGN PATENT DOCUMENTS

JP   2018-019300 A   2/2018

* cited by examiner

*Primary Examiner* — Nicholas Pachol  
(74) *Attorney, Agent, or Firm* — Hawaii Patent Services; Nathaniel K. Fedde; Kenton N. Fedde

(57) ABSTRACT

Provided is information processing apparatus that extracts a handwriting comment. A comment acquiring part searches handwriting comment from an image data of a scanned manuscript and acquire the handwriting comment in association with position information indicating the handwriting comment for an area of the manuscript. A filing part converts the handwriting comment acquired by the comment acquiring part into a file. An OCR part performs optical character recognition (OCR). A filing part performs OCR of the comment by the OCR part, and when recognizable as a character, converts character data of the handwriting comment into the file, and when unrecognizable as a character, acquires the area of the handwriting comment from image data of the manuscript and converts into the file.

18 Claims, 8 Drawing Sheets

Gray Men Come

At last, gray men came to my house. My mother shouted, my sister screamed and fell down. However, the gray men came into my room and began to look for my precious chest. As I said, "There is no such boogie," one of the

FIG.4     230

Gray Men Come

At last, gray men came to my house. My mother shouted, my sister screamed and fell down. However, the gray men ~~came~~ trooped into my room and began to look for my ~~precious~~ chest. As I said, "There is no such boogie," one of the 300-1

Gray Men Come

At last, gray men came to my house. My mother shouted, my sister screamed and fell

*How was your dad?* — 300-7 down. However, the gray men came into my room and began to look for my precious chest. As I said, "There is — 300-8

*What is it? Maybe more details need* no such ~~boogie~~." one of the

FIG. 7      200-3

Gray Men Come

At last, gray men came to my house. My mother shouted, my sister screamed and fell down. However, the gray men came into my room and began to look for my precious chest. As I said, "There is no such boogie," one of the

| | |
|---|---|
| USER B | (drawing: "I don't know" with face) |
| USER B | DON'T WRITE IT! |
| USER C | How was your dad? |
| USER B | T |
| USER A | trooped |
| USER B | bed |
| USER A | |
| USER C | What is it? More details needed. |

INFORMATION PROCESSING APPARATUS AND IMAGE FORMING APPARATUS PERFORMING FILE CONVERSION OF HANDWRITING COMMENT AND COMMENT EXTRACTION METHOD

BACKGROUND

The present disclosure relates to information processing apparatus, an image forming apparatus, and a comment extraction method, and, especially, is related with an information processing apparatus and an image forming apparatus, which a manuscript is scanned and processed, and a comment extraction method by using the apparatus.

An information processing apparatus as like an image forming apparatuses, such as an MFP (Multifunctional Peripheral), which can print a document and an image, is present. As for the manuscript printed by such an MFP or the like, a user may write it by handwriting. In a typical information processing apparatus, this written-in manuscript is read with a scanner and corrects the source data of a manuscript.

SUMMARY

An information processing apparatus of the present disclosure includes a comment acquiring part configured to search handwriting comment from an image data of a scanned manuscript and acquire the handwriting comment in association with position information indicating the handwriting comment for an area of the manuscript; and a filing part configured to convert the handwriting comment acquired by the comment acquiring part into a file.

An image forming apparatus of the present disclosure includes a reading part configured to scan a manuscript and acquires image data; a comment acquiring part configured to search handwriting comment from the image data of the manuscript scanned by the reading part and acquires the handwriting comment in association with position information indicating the handwriting comment for an area of the manuscript; and a filing part configured to convert the handwriting comment acquired by the comment acquiring part into a file.

A comment extraction method of the present disclosure is a comment extraction method executed by information processing apparatus, including the steps of: searching handwriting comment from an image data of a scanned manuscript; acquiring the handwriting comment in association with position information indicating the handwriting comment for an area of the manuscript; and converting the acquired handwriting comment into a file.

BRIEF DESCRIPTION OF THE DRAWINGS

FIG. 4 shows an example of the source data according to the embodiment of the present disclosures;

FIG. 5 shows an example of image data according to the embodiment of the present disclosures;

FIG. 7 shows an example of image data according to the embodiment of the present disclosures; and FIG. 8 shows an example of electronic document data according to the embodiment of the present disclosures.

DETAILED DESCRIPTION

Embodiment

[Control Configuration of Image Forming Apparatus 1]

Figure 1:
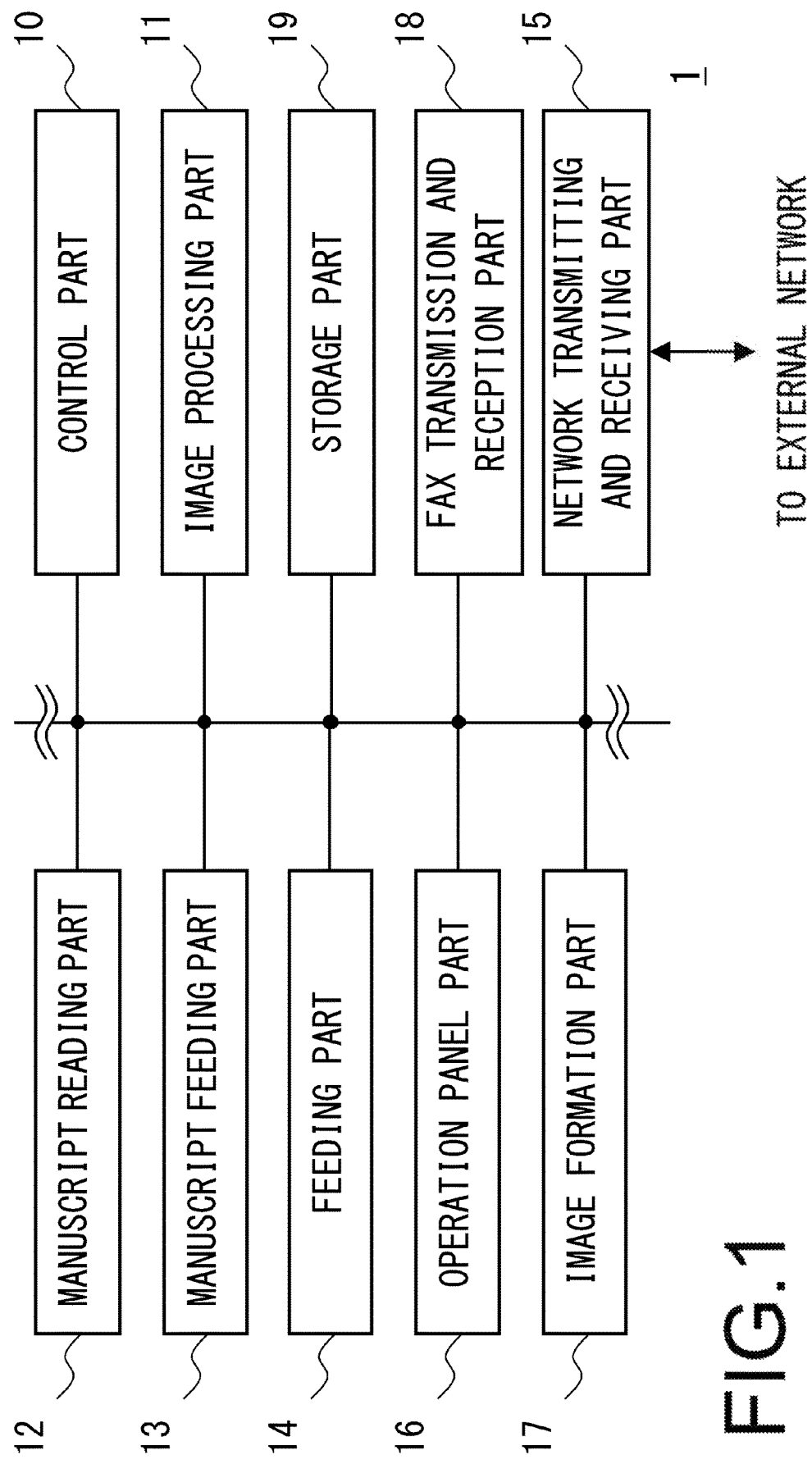
FIG. 1 is a block diagram showing a control configuration of an image forming apparatus according to the embodiment of the present disclosures.

Firstly, with reference to FIG. 1, a control configuration of image forming apparatus 1 is explained.

Image forming apparatuses 1 are information processing apparatus, such as an MFP, a network scanner, a document scanner, and network FAX. Image forming apparatus 1 is provided with manuscript reading part 12 which is a scanner as described below in the present embodiment.

In detail, image forming apparatus 1 includes image processing part 11, manuscript reading part 12, manuscript feeding part 13, feeding part 14, network transmitting and receiving part 15, operation panel part 16, image formation part 17 (image forming part), FAX transmission and reception part 18, and storage part 19 or the like. Each part is connected to control part 10 and is operation controlled by control part 10.

Control part 10 is an information processing part, such as GPP (General Purpose Processor), CPU (Central Processing Unit, central processing unit), MPU (Micro Processing Unit), DSP (Digital Signal Processor), GPU (Graphics Processing Unit), ASIC (Application Specific Integrated Circuit, processor for particular applications), or the like. Control part 10 reads the control program stored in ROM and HDD of storage part 19, expands this control program to RAM, executes it, and operates as each part of the functional block as described later. Also, control part 10 controls a whole apparatus corresponding to the specified instructions information inputted from an external terminal or operation panel part 16.

Figure 2:
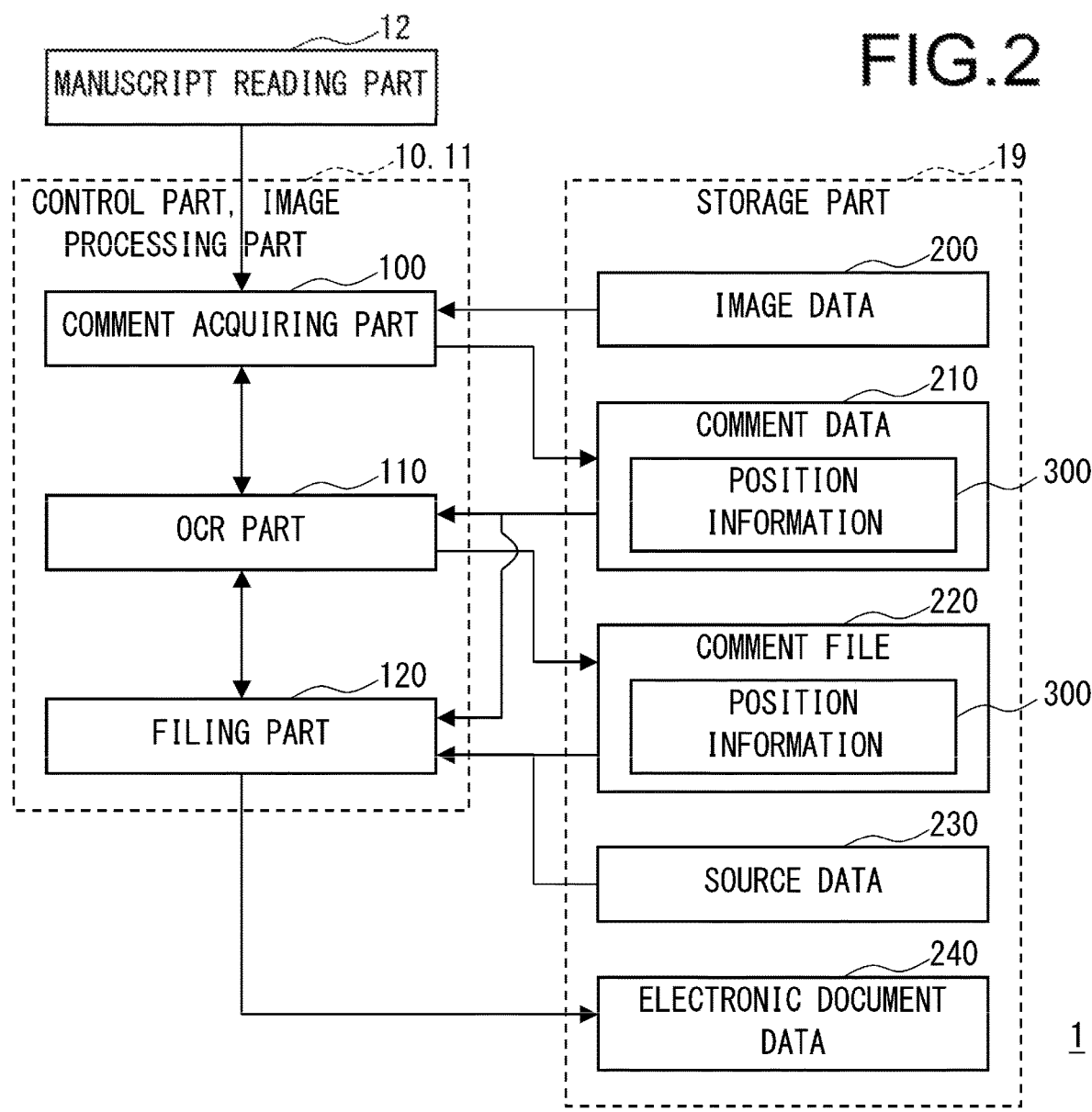
FIG. 2 is a block diagram showing a functional configuration of the image forming apparatus according to the embodiment of the present disclosures.
Figure 3:
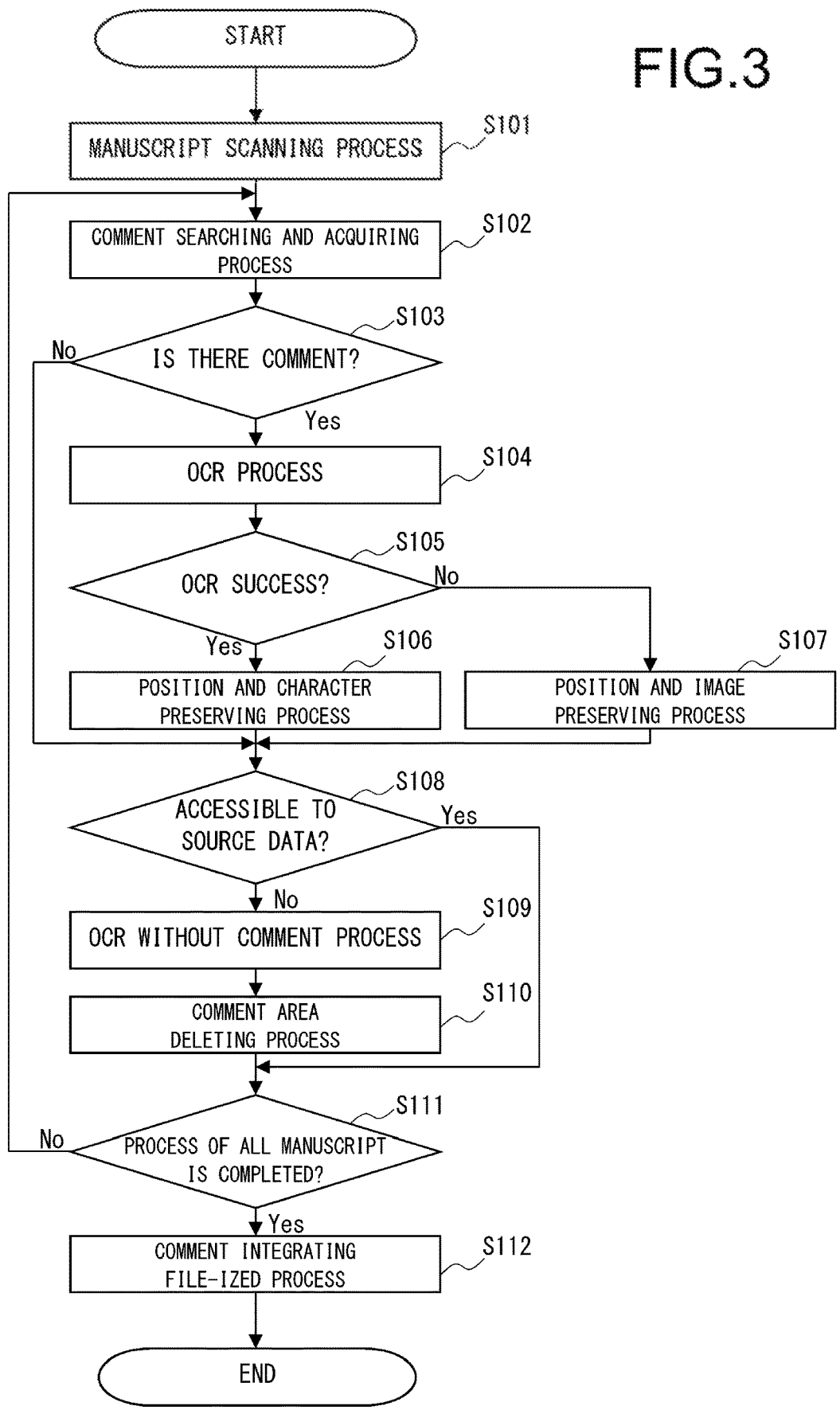
FIG. 3 is a flowchart of a handwriting comment extracting process according to the embodiment of the present disclosures.

Image processing part 11 is information processing parts, such as DSP (Digital Signal Processor), GPU (Graphics Processing Unit), ASIC, or the like. Image processing part 11 performs specified image processing for image data 200 (FIG. 2). The specified image processing may be, for example, a process of scaling, concentration tuning, gradation adjustment, an image improvement, or the like. Also, image processing part 11 can convert image data 200 read by manuscript reading part 12 into electronic document data 230. In this case, image processing part 11 can also convert image data 200 into files, such as electronic documents, such as PDF (Portable Document Format), TIFF, or the like. Also, image processing part 11 may be capable of executing at least a part of OCR (Optical Character Recognition) process. For example, the OCR in this case may perform calculation of a line segment, calculation of the writing order of a hand printed character, extraction of other characteristic quantity, or the like, and may distinguish a character or an image by a convolutional neural network, or the like, and, in case of the character, it may output a character code and accuracy. In addition, in the OCR, information encoded by one dimensional bar code, two dimensions bar code, dots, or the like, may be acquirable.

Manuscript reading part 12 is a photo scanner unit that scans the set manuscript and acquires image data 200 (FIG. 2). Manuscript reading part 12 is arranged on the upper part of the body part of image forming apparatus 1. Manuscript reading part 12 is provided with a scanner, platen glass, and a manuscript reading slit. Manuscript reading part 12, when reading the manuscript placed on the platen glass, moves the scanner to the position that faces platen glass, reads with scanning the manuscript placed on platen glass, acquires image data 200, and outputs the acquired image data 200 to control part 10.

Also, manuscript reading part 12, when reading the manuscript fed from manuscript feeding part 13, moves a scanner to the position that faces on the manuscript reading slit. Then, manuscript reading part 12 reads the manuscript synchronizing with the conveying operation of the manuscript by manuscript feeding part 13 via the manuscript reading slit and acquires image data 200. Manuscript reading part 12 outputs the acquired image data 200 to control part 10.

Manuscript feeding part 13 conveys the manuscript read by manuscript reading part 12. Manuscript feeding part 13 is arranged on the upper part of manuscript reading part 12. Manuscript feeding part 13 is provided with the manuscript mounting part and the manuscript transport mechanism. Manuscript feeding part 13 feeds out one manuscript placed on the manuscript mounting part one by one in order by the manuscript transport mechanism and transport to manuscript reading part 12.

Feeding part 14 feeds a recording paper one by one to image formation part 17. Feeding part 14 is provided with in the body part.

Network transmitting and receiving part 15 is a network connection part including a LAN board, a wireless transmitter receiver, or the like, for connecting with external networks, such as LAN, wireless LAN, WAN, a mobile phone network, or the like. Network transmitting and receiving part 15 transmits and receives data by the line for data communications and transmits and receives an audio signal by a voice call line.

Operation panel part 16 is provided with a input part, such as a button, a touch panel, or the like, and display parts, such as LCD (Liquid Crystal Display), an organic electroluminescence display, or the like. Also, operation panel part 16 is arranged in the front-side of image forming apparatus 1. The button of the input part of operation panel part 16 is a numeric keypad, a start, a cancel, switching of operational mode, and a button to instruct executing of a job, or the like. The operational mode may be provided with the type of mode, such as a copy, a FAX transmission, a scanner, a network scanner, or the like. Also, the job includes printing, transmission, storage, record, or the like, for the selected document. The input part of operation panel part 16 acquires instructions by a user about the various jobs of image forming apparatus 1. In the present embodiment, reading of the manuscript, which is written handwriting comment(s), instructing the place of source data 230 (FIG. 2) of the manuscript, or the like, is possible. In addition, to input and change each user information by the user instruction acquired by operation panel part 16 is also possible.

Image formation part 17 performs an image formation from the data stored in storage part 19, read by manuscript reading part 12, or acquired from the external terminal by output instruction by a user to a recording paper. Image formation part 17 is provided with a photoconductor drum, an exposure part, a developing part, a transfer part, a fixing part, or the like. Image formation part 17 records a toner image on the recording paper by executing the image formation process configured charging, exposure, development, transfer, and fixing.

FAX transmission and reception part 18 transmits and receives a facsimile. FAX transmission and reception part 18 can perform facsimile reception from other FAX equipment by a sound line, store in storage part 19, and perform image formation by image formation part 17. Also, FAX transmission and reception part 18 can convert the data of the manuscript read by manuscript reading part 12 or the data of network FAX transmitted from the external terminal into image data 200 and can perform facsimile transmission by a sound line to another FAX equipment.

Storage part 19 includes semiconductor memory, such as ROM (Read Only Memory) and RAM (Random Access Memory), HDD (Hard Disk Drive), or the like. Storage part 19 includes a non-transitory recording medium. RAM in storage part 19 is, even in a power saving state, holds a memory content by function, such as self refreshing, or the like. The control program for operation-controlling image forming apparatus 1 is stored in ROM and HDD of storage part 19. In addition, storage part 19 also stores user account settings. Also, the area of the storage folder for each user may be included in storage part 19.

In addition, in image forming apparatus 1, control part 10 and image processing part 11 may be integrally-formed as like CPU with built-in GPU, a chip-on module package, SOC (System On a Chip), or the like. Also, control part 10 and image processing part 11 may have embedded RAM, ROM, flash memory, or the like.

[Functional Configuration of Image Forming Apparatus 1]

Here, with reference to FIG. 2, a functional configuration of image forming apparatus 1 is explained. Control part 10 and image processing part 11 of image forming apparatus 1 are provided with comment acquiring part 100, OCR part 110, and filing part 120. Storage part 19 can store image data 200, comment data 210, comment file 220, source data 230, and electronic document data 240. In addition, either of data may be acquired or not according to advance of a process.

Comment acquiring part 100 searches a handwriting comment from image data 200 of the scanned manuscript. Comment acquiring part 100, when the handwriting comment has been searched, associates with position information 300, which indicates the comment for an area of the manuscript and acquires it.

OCR part 110 performs OCR (Optical Character Recognition). In the present embodiment, OCR part 110 can OCR a handwritten character, or the like.

Filing part 120 converts the handwriting comment acquired by comment acquiring part 100 into a file. In the present embodiment, filing part 120 performs OCR of the comment by OCR part 110, and when recognizable as a character, it converts the handwriting comment into comment file 220 including the character data. When unrecognizable as a character, filing part 120 acquires image data of an area of the handwriting comment from image data 200 of the manuscript by cutting (copying), or the like, and converts the area into comment file 220 including the image data of the area. In addition, when source data 230 of the manuscript is not able to acquired, filing part 120 can also perform OCR of the image data 200 of the manuscript by OCR part 110, can delete the area of the handwriting comment, and can convert it into electronic document data 240. Further, filing part 120 can add the file, which the handwriting comment is converted, to source data 230 of the manuscript or image data 200 as metadata and can convert it into electronic document data 240. In the present embodiment, filing part 120 can also add the file, which a plurality of the handwriting comments are converted, to electronic document data 240.

Image data 200 is data of the image acquired from the manuscript, which the handwriting comment is written by the user. In the present embodiment, an example is described in which image data 200 of a plurality of the users are acquired for the same document. In addition, in the following description, examples of different image data 200 are described with numerical values such as "–n" ("n" is an arbitrary number) added to the reference numerals.

Comment data 210 is data that indicates the area determined to be the handwriting comment by comment acquiring part 100. Comment data 210 may include the data of position information 300, which is binary data, and the data of the image, which is cut from image data 200. Comment data 210 may be, for example, temporary data, which is not data accessible from other programs, as comment file 220 indicated as follows.

Comment file 220 is a file of the extracted handwriting comment. Comment file 220 includes, for example, the character data in which optical character recognition is performed by OCR part 110, image data 200 of the area of the handwriting comment acquired from image data 200, the position information 300, or the like. Further, comment file 220 may also include the information that indicates the user, a group, or the like. In the present embodiment, a plurality of comment files 220 are created for each user.

Source data 230 is a file of the manuscript on which the handwriting comment is described. This file is a file of various applications, such as a PDF file, a word processor, a spreadsheet, or the like, which is generated by various applications (Application Software), or the like. In the present embodiment, character information is included in source data 230. The character information includes the information of a drawn position in a page.

Electronic document data 240 is, for example, a PDF file with a transparent character, a file of various applications, a file of HTML (Hyper-Text Markup Language), or the like. Electronic document data 240 include the data of the area of the handwriting comment converted from comment file 220 as metadata, or the like. The data of the area of the handwriting comment is data of the user, information of the position of the comment, the character data of main part of the comment, the image data, or the like.

Position information 300 is coordinate data of a polygon (polygon object) in image data 200. In addition, position information 300 includes a character code that indicates the comment for area of the manuscript and the information of the position on image data 200 for a page. The information on the position also includes coordinate information of image data 200. Also, when source data 230 has been acquired, the information on the position includes coordinate information in source data 230. Also, position information 300 may include the position of the character, the character itself, the tag, or the like, which are acquired by performing OCR of the image data 200 or from source data 230.

Here, control part 10 of image forming apparatus 1 executes the control program stored in storage part 19 and is functioned as comment acquiring part 100, OCR part 110, and filing part 120. Also, each part of the above-mentioned image forming apparatus 1 serves as hardware resources that executes the image forming method of the present disclosure. In addition, the above-mentioned part or arbitrary combination of a functional configuration may be configured as an IC, a programmable logic, FPGA (Field-Programmable Gate Array), or the like, in hardware.

[Handwriting Comment Extracting Process by Image Forming Apparatus 1]

Then, with reference to FIG. 3-FIG. 8, the handwriting comment extracting process by image forming apparatus 1 according to the embodiment of the present disclosures is explained. Firstly, in the handwriting comment extracting process of the present embodiment, the manuscript, which is written the handwriting comment by the user is scanned. Then, a handwriting comment is searched from image data 200 of the scanned manuscript. If the handwriting comment is able to be searched, it associates with position information 300, which indicates the comment for area of the manuscript and acquires as comment data 210. Then, acquired comment data 210 is converted into a file. The handwriting comment extracting process in the present embodiment collaborates with each part, and, mainly, control part 10 executes the program stored in storage part 19 by using hardware resources. In the following, with reference to the flow chart of FIG. 3, the details of handwriting comment extracting process are explained for each step.

(Step S101)

Firstly, comment acquiring part 100 performs manuscript scanning process. About source data 230 of the manuscript, the user stores source data 230, which can be acquired by image forming apparatus 1. This storage location may be a remote location on the cloud, such as a server or NAS (Network Attached Storage), which can be accessed via a network, or a local location, such as a document box in the storage part 19, or the like.

In FIG. 4, an example in the state where source data 230 is printed is shown.

Then, the user designates source data 230 stored in the document box, or the like, in operation panel part 16. Further, the user selects a scan with a status indicating that it is under review, currently. That is, a user instructs that the manuscript with the comment to be scanned is the manuscript, which source data 230 is reviewed. In addition, as described later, comment extraction is possible even if there is no source data 230. Comment acquiring part 100 makes manuscript reading part 12 read the manuscript, which the handwriting comment is written and is set by the user. In the present embodiment, comment acquiring part 100 can read and collect the handwriting comments by a plurality of the users as a "review." Therefore, a plurality of manuscripts are scanned and stored in storage part 19 as image data 200, respectively.

Figure 6:
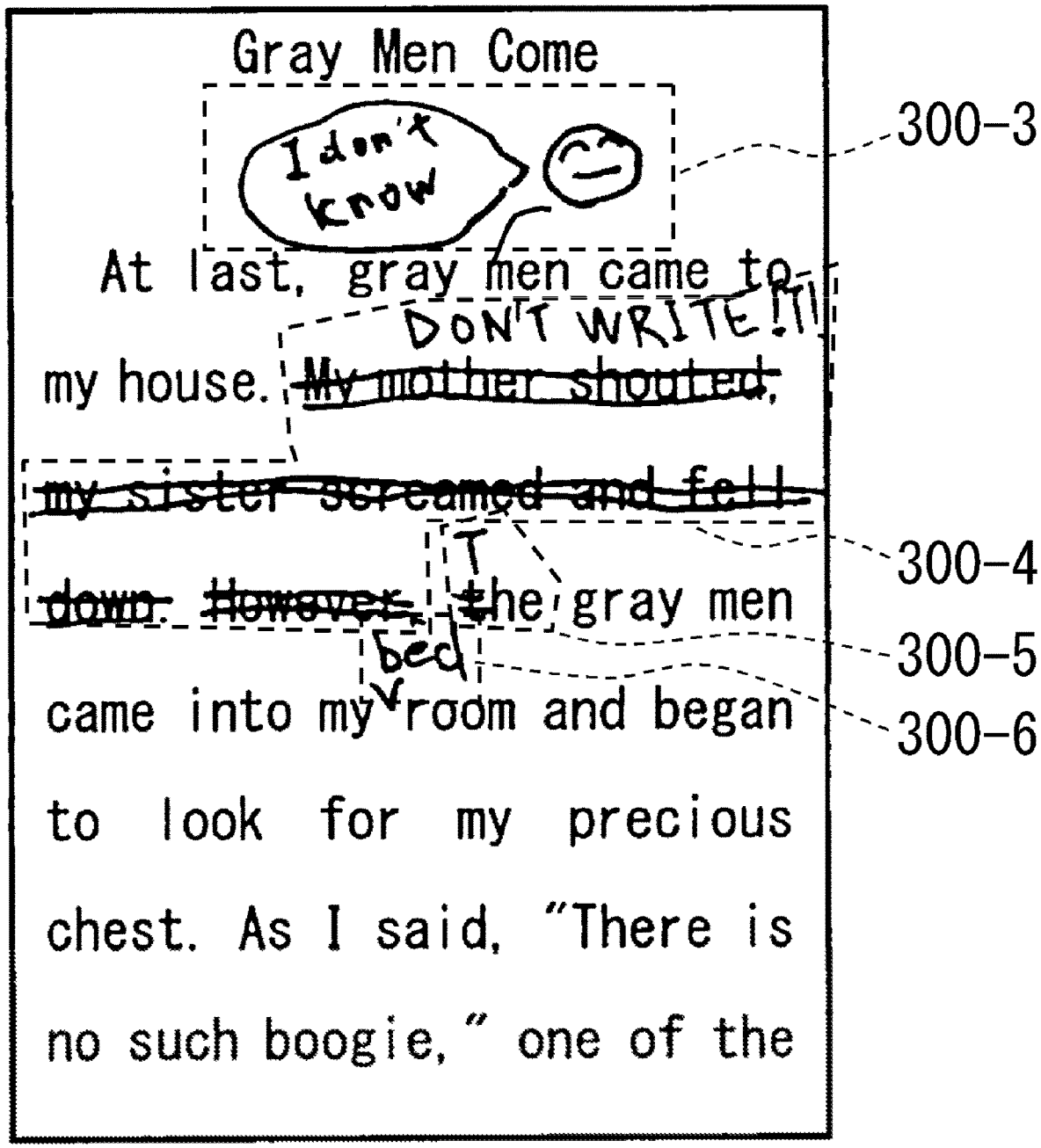
FIG. 6 shows an example of image data according to the embodiment of the present disclosures.

In FIG. 5, FIG. 6, and FIG. 7, examples of image data 200-1, image data 200-2, and image data 200-3, which are written the handwriting comments, by user A, B, and C, respectively, are shown.

(Step S102)

Then, comment acquiring part 100 performs a comment searching and acquiring process. Comment acquiring part 100 searches a handwriting comment from image data 200 stored in storage part 19. In detail, for example, comment acquiring part 100 calculates feature value from image data 200, detects an area other than a printed character, a table, a figure, or the like. Otherwise, comment acquiring part 100 may detect, for example, an area of a color designated for the comment other than black, such as red, blue, or the like. The designation of the color can be set up in operation panel part 16 by the user. Further, comment acquiring part 100 detects a strikethrough line, an underline, a handwritten bar line, or the like, for the detected area. This is for classifying whether it is a comment for a printed character, a table, a figure, or the like, in image data 200. That is, comment acquiring part 100 also calculates information of the position that indicates the comment for area in the manuscript. Comment acquiring part 100 determines, for example, the image of the area of the handwriting described on the upper and lower sides of strikethrough line, the upper and lower sides of the underline, and the tip of the bar line to be a comment.

In FIG. 5, FIG. 6, and FIG. 7, examples of position information 300-1—position information 300-8, which are searched as positions of handwriting comments, respectively, are shown.

(Step S103)

Then, filing part 120 determines whether there is any handwriting comment. Filing part 120 determines Yes if at least one of the area of the handwriting comment is in read image data 200. Filing part 120 determines with No if other. In Yes, filing part 120 advances a process to Step S104. In No, filing part 120 advances a process to Step S108.

(Step S104)

If there is the handwriting comment, OCR part 110 performs OCR process. In response to the instruction of filing part 120, OCR part 110 performs OCR of the area of the acquired comment. That is, OCR part 110 performs OCR of the comment. In this case, if a character is read, in addition to character data, OCR part 110 outputs the value of the probability of character recognition as "accuracy". In addition, if there are a plurality of handwriting comments, this OCR process is performed by the number of the handwriting comments. In addition, the extracted area of the handwriting comment is set as the detected area, and it is set as the exclusion target of the next OCR process. Thereby, as described later, if source data 230 is not able to be acquired, the area having the handwriting comment can be deleted, easily.

(Step S105)

Then, filing part 120 determines whether OCR is successful or not. In detail, filing part 120 determines Yes if the area of the comment is recognizable as a character. In detail, for example, if the character has been recognized by OCR for the area of the comment by OCR part 110 with the accuracy higher than a specific threshold, filing part 120 determines as OCR is success to be Yes. If the accuracy is lower than the threshold, filing part 120 determines No that OCR is not successful. In Yes, filing part 120 advances a process to Step S106. In No, filing part 120 advances a process to Step S107.

(Step S106)

If OCR is successful, filing part 120 performs a position and character preserving process. Filing part 120 converts the area of the handwriting comment acquired by comment acquiring part 100 into comment file 220 including the character data. In conversion to this comment file 220, filing part 120 includes the character data outputted by OCR and position information 300 on which area of the manuscript the comment is.

(Step S107)

If OCR is not successful, filing part 120 performs a position and image preserving process. Filing part 120 is converted the area of the handwriting comment acquired by comment acquiring part 100 into comment file 220 included as an image. In conversion to this comment file 220, filing part 120 also includes position information 300 on which area of the manuscript the comment is as corresponded to the position data of comment data 210. That is, if there are pictures, such as a figure and a waveform as a handwriting comment, image data 200 of the area is used as it is as the comment. Thus, about the area that cannot be read by OCR, file-izing is possible in the image data as the handwriting comment.

(Step S108)

Here, filing part 120 determines whether source data 230 is accessible or not. If source data 230 can be read from the location designated by the user, it is accessible, and that is, filing part 120 determines Yes. If other, that is, source data 230 cannot be accessed, filing part 120 determines No. In Yes, filing part 120 advances a process to Step S111. In No, filing part 120 advances a process to Step S109.

(Step S109)

If source data 230 cannot be accessed, filing part 120 performs OCR without comment process. That is, if source data 230 of the manuscript is unacquirable, filing part 120 also performs OCR of the image data 200 of the manuscript by OCR part 110. In this case, if there are a plurality of the manuscripts, filing part 120 selects image data 200 of the manuscript with the least comment or least dirt and executes OCR. Thereby, it becomes possible to increase the accuracy of OCR. For example, filing part 120 generates the file of electronic document data 240 and includes image data 200 in it. Further, filing part 120 performs OCR also about the area other than the position information 300 of the handwriting comment in image data 200 by OCR part 110 and includes it in electronic document data 240 as character data.

(Step S110)

Then, filing part 120 performs comment area deleting process. Filing part 120 deletes the area in electronic document data 240, which is extracted as the comment in image data 200. In detail, for example, filing part 120 fills the area of the handwriting comment by the background color of image data 200. The background color can be calculated by color code, or the like, which is the most numerous in places other than characters. Otherwise, filing part 120 may be deleted by copying & pasting with substituting the same area of image data 200 of another user who is not written the handwriting comment.

(Step S111)

Here, filing part 120 determines whether the processes of all the manuscripts is completed or not. Filing part 120 determines Yes if the processes for image data 200 of the written manuscript including handwriting comment of all the user(s) in all the pages are completed. Filing part 120 determines No if it has not completed yet. In Yes, filing part 120 advances a process to Step S112. In No, filing part 120 returns a process to Step S102 and continues search of the handwriting comment.

(Step S112)

If the processes of all the manuscripts is completed, filing part 120 performs a comment integrating file-ized process. If source data 230 is accessible, filing part 120 converts the source data 230 into electronic document data 240. If source data 230 is not accessible, filing part 120 uses electronic document data 240, which is already generated in above-mentioned step S109. Filing part 120 reads and interprets comment file 220 and adds it to electronic document data 240. In this case, for example, filing part 120 may add the handwriting comment to electronic document data 240 as metadata. This metadata includes information indicating the content of the comment, which area of the manuscript the comment is for, or the like. Furthermore, filing part 120 adds comments of a plurality of users to electronic document data 240 so as to be distinguishable from each other. Thereby, in the converted electronic document data 240, the area of the handwritten comment becomes invisible, directly, and it becomes possible to set whether or not to display. This is because the handwriting comment is not included in source data 230, and the area where the handwriting comment is written in scanned image data 200 is deleted.

In FIG. 8, an example of electronic document data 240 converted into the file of the word processor with the comments is shown. Thus, grasping the comment for each user, collectively, is possible. In addition, this electronic document data 240 can be transmitted to a user terminal, or the like, by e-mail, messenger, or the like, or can be transmitted to a cloud, NAS, or the like. Otherwise, electronic document data 240 is performed facsimile transmission, is stored in the document box of the user in storage part 19 or can be printed by using image formation part 17, again, or the like. The user can also browse the electronic document data 240 with a terminal, such as PC, a smart phone, or the like. As the above-mentioned, the handwriting comment extracting process according to the embodiment of the present disclosures is ended.

As configured in this way, the following effects can be obtained. When reviewing documents such as specification sheet, there is a case where printing is done on paper from the ease of being able to work anywhere, and handwriting comments are written there with a red pen, or the like. Each reviewer scans a document with a scanner provided in an image forming apparatus after writing a handwriting comment. In a typical technology, it is possible that scanning an image, which has been subjected to revised handwriting and to convert it into electronic data as reflecting the contents of modification. However, to extract the user's handwriting comment itself is not supposed. As compared with this, image forming apparatus 1 according to the embodiment of the present disclosures is an information processing apparatus that includes: a comment acquiring part 100 that searches handwriting comment from image data 200 of a scanned manuscript and acquire the handwriting comment in association with position information 300 indicating the handwriting comment for an area of the manuscript; and a filing part 120 that converts the handwriting comment acquired by the comment acquiring part 100 into a file. As configured in this way, when reviewing a document, or the like, to extract a handwriting comment itself becomes possible. That is, the manuscript, which is written the handwriting comment, can be read, and the handwriting comment itself can be extracted with position information 300. Thereby, to grasp as contrasted with comment file 220, which is a file of the extracted handwriting comment, and an original document.

Also, image forming apparatus 1 according to the embodiment of the present disclosures further includes has OCR part 110 to perform OCR, and filing part 120 performs OCR of the handwriting comment by the OCR part 110, when recognizable as a character, converts character data of the handwriting comment into the comment file 220, and when unrecognizable as a character, acquires the area of the handwriting comment from image data 200 of the manuscript and converts the area into the comment file 220. As configured in this way, the handwriting comments are also stored in the file as character data if they can be converted into the character data by OCR. Otherwise, a handwriting comment is stored as it is as an image if they cannot be the character data. Thereby, the comment for the same area can be collected, and thus saving the trouble of checking multiple documents side by side, preventing overlooking of comments, or the like, is performed. In addition, by separately preparing the comment file 220, it is easy to realize later when adding comments to source data 230 or electronic document data 240 of the manuscript.

Also, image forming apparatus 1 according to the embodiment of the present disclosures, the filing part 120, when source data 230 of the manuscript is unacquirable, make the image data 200 of the manuscript OCR by the OCR part 110, deletes the area of the handwriting comment, and converts it into electronic document data 240. As configured in this way, even if source data 230 is not able to be accessed, the area of the handwriting comment is deleted, and electronic document data 240 in the state where the comment of the character data or the image is added can be generated. As a result, the reviewing efficiency of the user can be improved by the electronic document data 240 for easy reviewing.

Also, image forming apparatus 1 according to the embodiment of the present disclosures, the filing part 120 adds the comment file 220, which the handwriting comment is converted, to source data 230 of the manuscript or the image data 200 as metadata, and it converts them into electronic document data 240. As configured in this way, a manuscript with the two fields, a manuscript layer and a handwriting comment layer, can be reconstructed. Thereby, a user who refers to the reconstructed document can switch between a display of only the manuscript and a display of the manuscript with the comment. Therefore, the reviewing efficiency can be improved.

Also, image forming apparatus 1 according to the embodiment of the present disclosures, the filing part 120 adds the comment file 220 that a plurality of handwriting comments are converted to the electronic document data 240. As configured in this way, a plurality of areas of the handwriting comments, the handwriting comments of a plurality of the users are extracted and are collected into electronic document data 240, and the document data with these comments can be generated. As a result, as shown in the example of FIG. 8, the review by two or more users can be grasped at once, and the reviewing efficiency increases.

OTHER EMBODIMENTS

In addition, in the above-described embodiment, it is described that source data 230 of a manuscript is preliminarily-designated by the user. However, at the time of the scanning of the manuscript, which is written the handwriting comment, filing part 120 may apply a title page to OCR, may search storage part 19, an accessible cloud, NAS, or the like, according to the title, the version, or the like, and may acquire source data 230. In this case, if source data 230 is acquirable, a process that has a source manuscript can be executed. Furthermore, when a "review mode" is designated and outputted in the case of the outputting source data 230, identification information may be printed in a margin, or the like. The identification information may be a character string, a numerical value, one dimension or a two dimensions bar code, dots, or the like. In addition, the identification information may include the location of source data 230. In this case, OCR part 110 may recognize the identification information and make access to the source data 230. As configured in this way, only by reading the manuscript for review, it can be easily converted into electronic document data 240 with a comment. Therefore, the trouble of the user can be reduced.

Further, in an above-mentioned embodiment, it is described that the area of the handwriting comment is searched, directly, from image data 200 of the scanned manuscript. However, by designating source data 230 at the time of a scan, accelerating search of the area of the handwriting comment is also possible. That is, it is possible to calculate the difference data between the image rendered from image data 200 and image rendered by the source data 230, and to search the location of the handwriting comment from the difference data. This makes it easy to skip pages or parts where there are no handwriting comment. In addition, OCR can be greatly omitted.

Furthermore, in the above-described embodiment, an example in which a document is reviewed by a plurality of users of reviewers has been described. However, image forming apparatus 1 can be used for other purposes. For example, as another purpose, when materials such as seminars and conferences are distributed on that day, the participant fills handwriting comments (memos) such as important remarks in the distributed materials. The participant may return to the office, or the like, may scan the materials, and may convert them into electronic document data 240 by OCR. In such a purpose, handwriting comment by the participant is extracted, and it is possible to save it as a memo, separately from the main text. Also, electronic document data 240 of these materials may be converted into the file of an application, such as a word processor, or the like. In this case, it is also possible to perform re-composition based on comment file 220. Then, when hoping to hand out the materials as they are to colleagues, hiding comments, showing comments, or the like, is possible. That is, it is utilizable on various scenes.

Also, the present disclosure is applicable to information processing apparatus other than an image forming apparatus. That is, it may be a configuration by using a network scanner, a server, or the like, which is connected with a scanner by USB, or the like, separately.

Also, the configuration and operation of the above-mentioned embodiment is an example, and it cannot be over-emphasized that it can change suitably and can execute in the range that does not deviate from the aim of the present disclosure.

What is claimed is:

1. An information processing apparatus comprising:
   a comment acquiring part configured to search handwriting comment from an image data of a scanned manuscript and acquire the handwriting comment in association with position information indicating the handwriting comment for an area of the manuscript;
   a filing part configured to convert the handwriting comment acquired by the comment acquiring part into a file; and
   an OCR part configured to perform OCR (optical character recognition), wherein
   the filing part is configured to
   perform OCR of the handwriting comment by the OCR part,
   determine whether the handwriting comment is recognizable as a character,
   when recognizable as a character, convert character data of the handwriting comment into the file,
   when unrecognizable as a character, acquire an area of the handwriting comment from the image data of the manuscript and convert the area into the file,
   determine whether source data, which is a version of the manuscript without the handwriting comment, is acquirable, and then when the source data is unacquirable, perform OCR by the OCR part of an area of the image data of the manuscript other than the area of the handwriting comment,
   delete the area of the handwriting comment from the image data,
   convert the image data, having the handwriting comment deleted, into electronic document data, and then
   add the character data of the handwriting comment from the file or the area of the handwriting comment from the file to the electronic document data.

2. The information processing apparatus according to claim 1, wherein
   the filing part
   adds the file, to which the handwriting comment is converted, as metadata, to either the source data of the manuscript or the image data having the handwriting comment deleted, and converts the file-added source data or the file-added image data into the electronic document data such that the electronic document data has
   a first layer being the source data or the image data; and
   a second layer being the handwriting comment metadata such that it is possible to switch between display of the first layer with the second layer and display of the first layer without the second layer.

3. The information processing apparatus according to claim 2, wherein
   the filing part
   adds the file that a plurality of handwriting comments are converted to the electronic document data.

4. The information processing apparatus according to claim 1, wherein
   the handwriting comment is a first handwriting comment;
   the manuscript is a first manuscript;
   the image data is a first image data;
   the area of the handwriting comment is a first area;
   the comment acquiring part is configured to search a second handwriting comment from a second image data of a scanned second manuscript and acquire the second handwriting comment in association with position information indicating the second handwriting comment for an area of the second manuscript;
   the second manuscript differs from the first manuscript by handwriting comment of the respective first and second manuscripts;
   the filing part is configured to convert the second handwriting comment acquired by the comment acquiring part into the file;
   the filing part is configured to
   perform OCR of the second handwriting comment by the OCR part,
   when recognizable as a character, convert character data of the second handwriting comment into the file,
   when unrecognizable as a character, acquire a second area of the second handwriting comment from the second image data of the second manuscript and convert the second area into the file,
   perform OCR by the OCR part of an area of the second image data of the second manuscript other than the second area of the second handwriting comment,
   add the character data of the second handwriting comment from the file or the second area of the second handwriting comment from the second file to the electronic document data such that the electronic document data comprises
   the image data of the first manuscript, having the first handwriting comment deleted;
   the character data of the first handwriting comment from the file or the first area of the first handwriting comment from the file; and
   the character data of the second handwriting comment from the file or the second area of the second handwriting comment from the file.

5. The information processing apparatus according to claim 4, wherein
when the source data is unacquirable,
the filing part selects, from a plurality of scanned manuscripts, a manuscript with the least dirt as the first manuscript to provide the basis for said deleting the area of the handwriting comment and said converting the image data, having the handwriting comment deleted, into electronic document data.

6. The information processing apparatus according to claim 1, wherein the filing part performs said step of determining whether the handwriting comment is recognizable as a character by determining whether a character of the handwriting comment is recognized by OCR with an accuracy higher than a specific threshold.

7. The information processing apparatus according to claim 1, wherein the filing part
after said step of deleting the area of the handwriting comment from the image data, and prior to said step of converting the image data, having the handwriting comment deleted, into electronic document data, the filing part
fills the area of the handwriting comment with a background color, wherein the filing part determines the background color as a color which is the most numerous in places other than characters of the image data.

8. The information processing apparatus according to claim 1, wherein the manuscript includes identification information comprising a character string, numerical value, or a bar code which is recognized by the OCR, and the filing part performs said step of determining whether the source data of the manuscript is acquirable based on the recognized identification information.

9. The information processing apparatus according to claim 1, wherein if the scanned manuscript contains a plurality of handwriting comments, a OCR process is performed by the number of the handwriting comments, wherein an acquired area of a respective handwriting comment is set as a detected area, and the detected area is set as an exclusion target of a next OCR process.

10. The information processing apparatus according to claim 1, wherein the comment acquiring part detects the handwriting comment during the search by detecting an area that is determined to be an area that is not a printed character, a table, or a figure.

11. The information processing apparatus according to claim 1, wherein the comment acquiring part detects the handwriting comment during the search by detecting an area that comprises a designated color, wherein the designated color can be set from operation panel of the information processing apparatus by a user.

12. The information processing apparatus according to claim 1, wherein the comment acquiring part detects the handwriting comment during the search by detecting an area that comprises an underline, a bar line, or a strikethrough.

13. An image forming apparatus comprising:
a reading part configured to scan a manuscript and acquire image data;
a comment acquiring part configured to search handwriting comment from the image data of the manuscript scanned by the reading part and acquire the handwriting comment in association with position information indicating the handwriting comment for an area of the manuscript;
a filing part configured to convert the handwriting comment acquired by the comment acquiring part into a file; and
an OCR part configured to perform OCR (optical character recognition), wherein
the filing part is configured to
perform OCR of the handwriting comment by the OCR part,
determine whether the handwriting comment is recognizable as a character,
when recognizable as a character, convert character data of the handwriting comment into the file,
when unrecognizable as a character, acquire an area of the handwriting comment from the image data of the manuscript and convert the area into the file,
determine whether source data, which is a version of the manuscript without the handwriting comment, is acquirable, and then when the source data is unacquirable, perform OCR by the OCR part of an area of the image data of the manuscript other than the area of the handwriting comment,
delete the area of the handwriting comment from the image data,
convert the image data, having the handwriting comment deleted, into electronic document data, and then
add the character data of the handwriting comment from the file or the area of the handwriting comment from the file to the electronic document data.

14. The image forming apparatus according to claim 13, wherein
the filing part
adds the file, to which the handwriting comment is converted as metadata, to either the source data of the manuscript or the image data having the handwriting comment deleted, and converts the file-added source data or the file-added image data into the electronic document data such that the electronic document data has
a first layer being the source data or the image data; and
a second layer being the handwriting comment metadata such that it is possible to switch between display of the first layer with the second layer and display of the first layer without the second layer.

15. The image forming apparatus according to claim 14, wherein the filing part
adds the file that a plurality of handwriting comments are converted to the electronic document data.

16. A comment extraction method executed by a control part of information processing apparatus, comprising the steps of:
searching handwriting comment from an image data of a scanned manuscript;
making the handwriting comment OCR (optical character recognition);
acquiring the handwriting comment in association with position information indicating the handwriting comment for an area of the manuscript; and
determining whether the handwriting comment is recognizable as a character;
when recognizable as a character, converting character data of the handwriting comment into a file; and
when unrecognizable as a character, acquiring the area of the handwriting comment from image data of the manuscript and converting into the file;
determining whether source data, which is a version of the manuscript without the handwriting comment, is acquirable, and then when the source data is unacquirable, making the image data of the manuscript OCR;
deleting the area of the handwriting comment from the image data; and converting the image data, having the handwriting comment deleted, into electronic document data; and then adding the character data of the handwriting comment from the file or the area of the handwriting comment from the file to the electronic document data.

17. The comment extraction method according to claim 16 further comprising step(s) of:

adding the file, to which the handwriting comment is converted, as meta data to either the source data of the manuscript or the image data having the handwriting comment deleted; and converting the file-added source data or the file-added image data into the electronic document data such that the electronic document data has a first layer being the source data or the image data; and a second layer being the handwriting comment metadata such that it is possible to switch between display of the first layer with the second layer and display of the first layer without the second layer.

18. The comment extraction method according to claim 17 further comprising step(s) of:

adding the file that a plurality of handwriting comments are converted to the electronic document data.

* * * * *